(12) United States Patent
Lord

(10) Patent No.: US 8,613,097 B2
(45) Date of Patent: Dec. 17, 2013

(54) METHODS AND SYSTEMS FOR DETECTING AN ACCESS ATTACK

(75) Inventor: Robert B. Lord, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1534 days.

(21) Appl. No.: 11/469,476

(22) Filed: Aug. 31, 2006

(65) Prior Publication Data

US 2008/0060078 A1    Mar. 6, 2008

(51) Int. Cl.
*H04L 9/32*    (2006.01)
*H04K 1/00*    (2006.01)
*H04N 7/16*    (2011.01)
*G06F 7/04*    (2006.01)

(52) U.S. Cl.
USPC ........ 726/26; 726/5; 726/17; 726/19; 726/27; 726/30; 713/183; 713/184; 713/185; 709/227; 709/228

(58) Field of Classification Search
USPC .......................................................... 726/26
See application file for complete search history.

(56) References Cited

U.S. PATENT DOCUMENTS

| | | | | |
|---|---|---|---|---|
| 5,093,861 A * | 3/1992 | Graham | .......................... | 713/185 |
| 5,239,583 A * | 8/1993 | Parrillo | ............................ | 705/72 |
| 5,394,471 A * | 2/1995 | Ganesan et al. | .............. | 713/183 |
| 5,475,755 A * | 12/1995 | Matsumoto | .................... | 713/183 |
| 6,587,032 B2 * | 7/2003 | Armingaud | .................. | 340/5.31 |
| 6,895,514 B1 * | 5/2005 | Kermani | ......................... | 726/19 |
| 7,299,359 B2 * | 11/2007 | Hurley | ........................... | 713/182 |
| 7,373,516 B2 * | 5/2008 | Ashok et al. | ................... | 713/183 |
| 7,394,101 B2 * | 7/2008 | Watanabe et al. | ................ | 257/72 |
| 7,523,318 B2 * | 4/2009 | Goal et al. | ..................... | 713/184 |
| 7,581,245 B2 * | 8/2009 | Rojewski | .......................... | 726/6 |
| 7,673,795 B2 * | 3/2010 | Millett et al. | ................. | 235/382 |
| 7,689,831 B2 * | 3/2010 | Goertzen | ....................... | 713/185 |
| 7,793,335 B2 * | 9/2010 | Bali et al. | ........................... | 726/2 |
| 8,099,607 B2 * | 1/2012 | Sandhu et al. | ................ | 713/189 |
| 2002/0133606 A1 * | 9/2002 | Mitomo et al. | ............... | 709/229 |
| 2002/0147930 A1 * | 10/2002 | Pritchard et al. | ............. | 713/202 |
| 2004/0064742 A1 * | 4/2004 | Excoffier et al. | ............. | 713/202 |
| 2004/0177272 A1 * | 9/2004 | Walters | .......................... | 713/201 |
| 2004/0187018 A1 * | 9/2004 | Owen et al. | .................... | 713/200 |
| 2004/0255155 A1 * | 12/2004 | Stading | .......................... | 713/201 |
| 2005/0139658 A1 * | 6/2005 | Lambert et al. | ............. | 235/382.5 |
| 2005/0198537 A1 * | 9/2005 | Rojewski | ....................... | 713/202 |
| 2005/0262563 A1 * | 11/2005 | Mahone et al. | .................. | 726/22 |
| 2005/0273625 A1 * | 12/2005 | Dayan et al. | ................... | 713/184 |
| 2006/0136737 A1 * | 6/2006 | Bauchot et al. | ............... | 713/183 |
| 2006/0259960 A1 * | 11/2006 | Kondo | ............................... | 726/6 |
| 2007/0136792 A1 * | 6/2007 | Ting et al. | .......................... | 726/5 |

* cited by examiner

OTHER PUBLICATIONS

Mueller, D., 'Authentication Scenario for Cyberciege', Naval Postgraduate School, Sep. 2005, entire document, http://www.cisr.us/downloads/theses/05thesis_mueller.pdf.*

*Primary Examiner* — Edan Orgad
*Assistant Examiner* — Ronald Baum
(74) *Attorney, Agent, or Firm* — Lowenstein Sandler LLP

(57) ABSTRACT

Embodiments of the present invention may detect an access attack by analyzing the passwords from successive access requests in an access session or by analyzing successive access attempts to determine patterns in the access information. For example, the analysis may consist of examining the access information to determine cycling in passwords of the access information. Cycling passwords may consist of password that are varied in a predictable or repetitive manner such as "aaaa", "aaab", "aaac", "aaad", etc. In addition, the usernames and passwords from successive access requests in an access session are analyzed to determine patterns in both the usernames and passwords. The analysis may consist of examining the access information to determine the use of identical passwords for various usernames. The analysis may also detect the cycling of passwords across multiple usernames.

10 Claims, 5 Drawing Sheets

METHODS AND SYSTEMS FOR DETECTING AN ACCESS ATTACK

FIELD

This invention relates generally to security systems and methods.

BACKGROUND

Access to most computer systems and applications require a user to establish a user account and to enter access information such as a username and password. A user's password is maintained in secret to prevent unauthorized access using the password. To gain unauthorized entry to a computer system, attackers may attempt to "guess" a user's password. Attackers attempt access by entering a username and trying different passwords in order to gain entry. For example, the attacker may attempt access by cycling of passwords such as "aaaa", "aaab", "aaac", "aaad", etc. Attackers also attempt access by holding a password static and cycling through different usernames.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

To gain unauthorized entry to a computer system, attackers may attempt to "guess" a user's password. Attackers attempt access by entering a username and trying different passwords or holding a password constant and entering different usernames in order to gain entry. According to embodiments of the present disclosure, an access attack may be detected by analyzing successive access attempts to determine patterns in the access information.

According to embodiments, the passwords from successive access requests in an access session are analyzed to determine patterns in the passwords. The analysis may consist of examining the access information to determine cycling in passwords of the access information. Cycling passwords may consist of password that are varied in a predictable or repetitive manner such as "aaaa", "aaab", "aaac", "aaad", etc.

According to some embodiments, an application may also detect an access attack by analyzing successive access attempts to determine patterns in the access information. The usernames and passwords from successive access requests in an access session are analyzed to determine patterns in the usernames and passwords. The analysis may consist of examining the access information to determine the use of identical passwords for various usernames. Embodiments of the application may be applied to any sort of authentication service including basic login and password services to those services that employ smartcards. The analysis may also detect the cycling of passwords across multiple usernames.

In addition, the analysis may be flexible in determining which attempts are considered from an attack. For example, a user typing the same incorrect password repeatedly may be viewed as human error rather than a form of attack. In such cases, the repeated entry of the same password may be tolerated and not count against the user's limit for failed attempts before their account or smartcard is locked.

Reference will now be made in detail to the exemplary embodiments of the invention, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
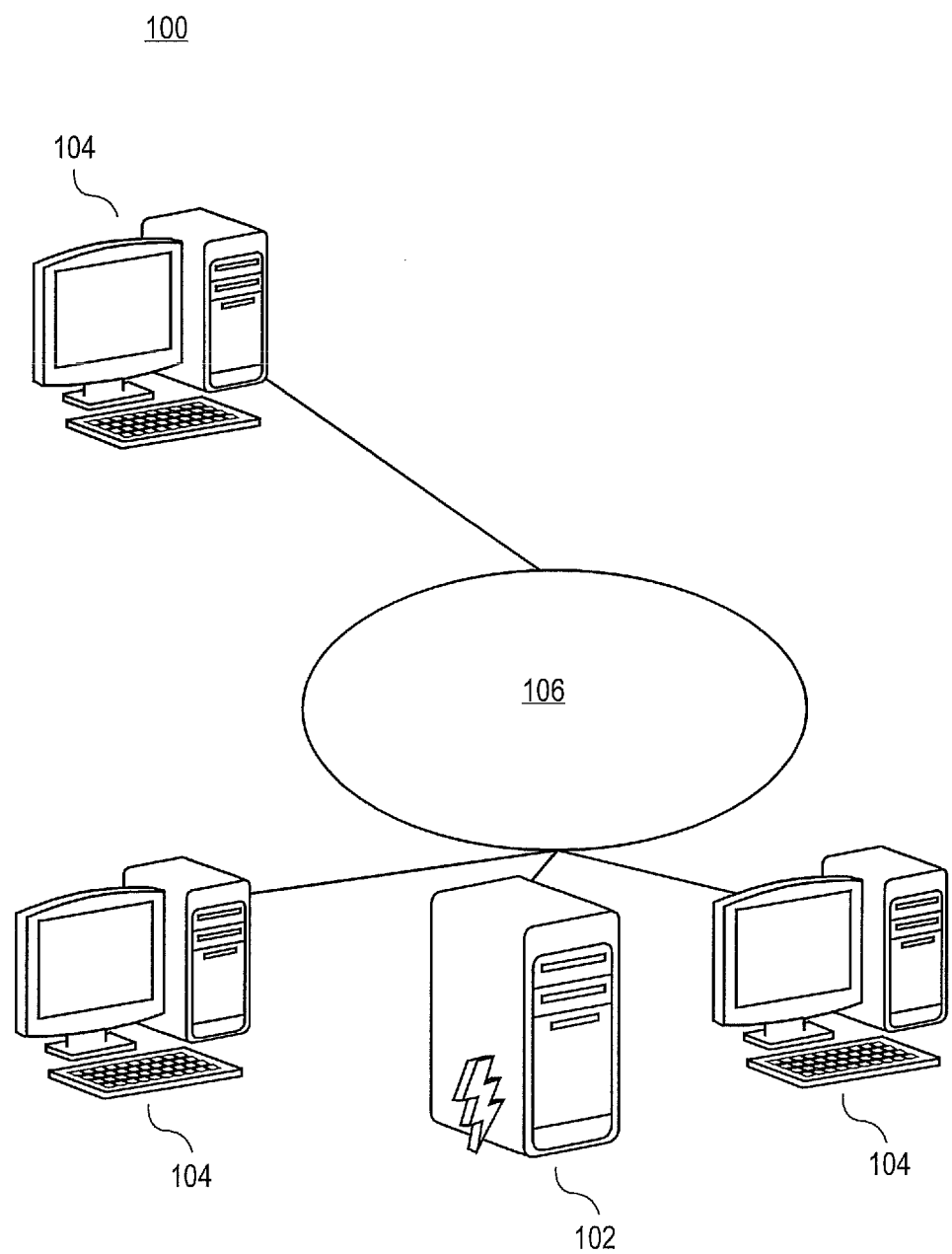
FIG. 1 is a diagram illustrating an exemplary network system consistent with embodiments of the present disclosure.

According to embodiments of the present disclosure, an access attack may be detected by analyzing successive access attempts to determine patterns in the access information. FIG. 1 is a diagram illustrating a network system 100 in which access attacks may be detected. System 100 may include a server 102 and clients 104. Server 102 and clients 104 may be interconnected via a network 106. Network 106 may be any type of network such as an internet, the Internet, a wide area network, or a local area network. FIG. 1 shows system 100 including three clients and one server connected via a single network. One skilled in the art will realize that system 100 may include any number of clients and servers connected via multiple networks.

Server 102 may be a computing machine or platform configured to execute a network system through an operating system in conjunction with clients 104. Server 102 may send data to clients 104 and receive data from clients 104. Server 102 may be configured to host secure destinations, such as SSL websites. Server 102 may be implemented with any known server platforms such as those from Intel, Advanced Micro Devices, Hewlett-Packard, etc. One skilled in the art will realize that the above server systems are exemplary and server 102 may be implemented in any known platform.

Clients 104 may be computing machines or platforms configured to execute applications to perform methods for detecting an access attack. Clients 104 may implements network application such as web browsers. Clients 104 may be implemented with personal computers, workstations, thin clients, thick clients, or other similar computing platforms. Clients 104 may use operating systems such as Linux, Windows, Macintosh or other available operating systems. One skilled in the art will realize that the implementations of clients 104 are exemplary and clients 104 may be implemented in any type of computer system.

Figure 2:
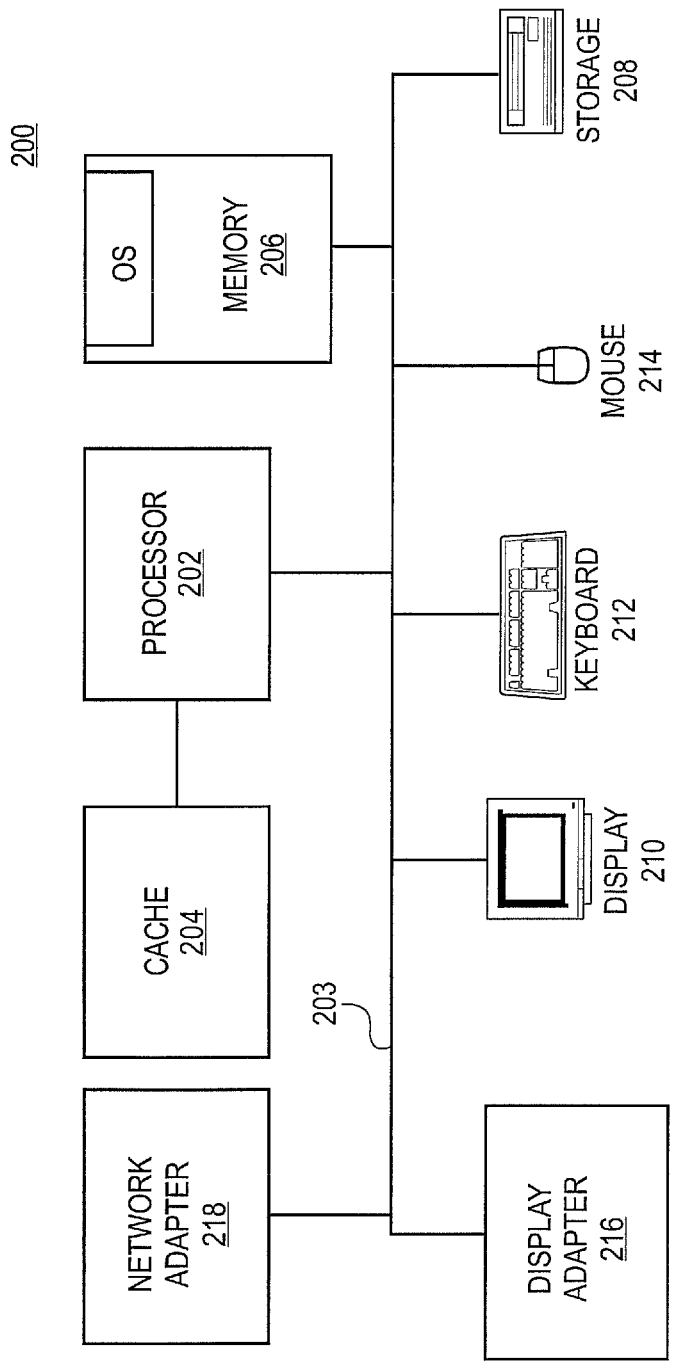
FIG. 2 is a diagram illustrating an exemplary computing platform consistent with embodiments of the present disclosure.

FIG. 2 is a block diagram of an exemplary computing platform 200 capable of performing embodiments of the present disclosure. Computing platform 200 may be utilized as clients 104 and server 102. The methods for detecting access attacks may be implemented in an application written in program code and executed by the computing platform 200. The application may be implemented in computer languages such as PASCAL, C, C++, JAVA, HTML and the like. For example, when a SSL website is being accessed, a web browser, such as Explorer, Firefox, etc., may be executed on computing platform 200. One skilled in the art will realize that the methods for preventing access attacks may be implemented in any computer language and any application capable of establishing a network connection.

As shown in FIG. 2, the computing platform 200 may include one or more processors such as the illustrated processor 202 that provide an execution platform for embodiments of the of the present disclosure. Processor 202 may be connected to a cache 204 to serve as a working memory. Commands and data from the processor 202 may be communicated over a communication bus 203.

Computing platform 200 may include a main memory 206, such as a Random Access Memory (RAM), where the operating system and applications implementing the methods described above may be executed during runtime. Main memory 206 may be coupled to communication bus 203.

Computing platform 200 may include one or more secondary memories 208. Secondary memories may be coupled to communications bus 203. The secondary memories 208 may include, for example, a hard disk drive and/or a removable storage drive, representing a floppy diskette drive, a magnetic tape drive, a compact disk drive, and the like, where a copy of a computer program embodiment for applications detecting access attacks may be stored. The secondary memories 208 may read from and/or write to between themselves in a well-known manner.

Computing platform 200 may also include a keyboard 212, a mouse 214, and a display 210 for allowing a user to interface with computing platform 200. Keyboard 212, mouse 214, and display 210 may be coupled to communications bus 203. Computing platform 200 may also include a display adapter 216. Display adapter 216 may be coupled to communication bus 203. Display adapter 216 can interface with the communication bus 203 and the display 210 and can receive display data from the processor 202 and converts the display data into display commands for the display 210.

Computing platform 200 may also include a network adapter 218. Network adapter 218 may be coupled to communication bus 203. Network adapter 218 may allow computing platform 200 to send and receive data via a network, such as network 106.

According to embodiments of the present disclosure, any of the methods can be embodied on a computer readable storage medium as instruction for causing a computer platform to perform the instructions. The computer readable storage medium may include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software programs of the computer program on a CD-ROM or via Internet download. In a sense, the Internet itself, as an abstract entity, is a computer readable medium. The same is true of computer networks in general.

Figure 3:
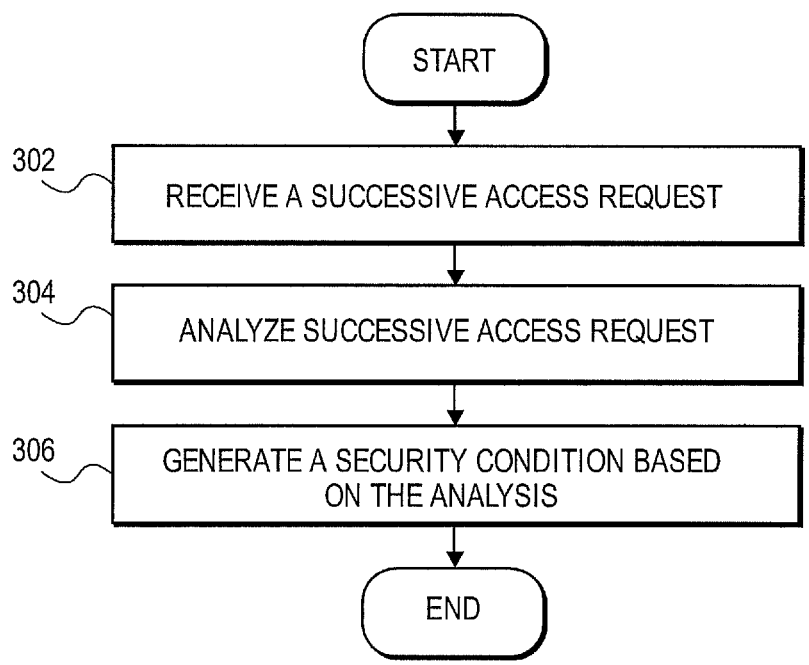
FIG. 3 is a flow diagram illustrating a method for preventing an access attack consistent with embodiments of the present disclosure.

FIG. 3 is a flow diagram illustrating a method 300 for detecting an access attack. Method 300 detects an access attack by analyzing successive access requests to determine patterns in the access information. The analysis may consist of examining the access information to determine cycling in passwords of the access information. The analysis may also consist of examining the access information to determine cycling in the usernames.

Method 300 may be implemented in any type of application for granting access executed on a computing platform. For example, method 300 may be performed by a web browser or website host applications executed on a computing platform. Method 300 may be performed on any computing platform or computing platform in a network system, such as computer platform 200 and network system 100 described below. One skilled in the art will realize that method 300 may be performed on any computing platform in which access to a system requires entry of access information.

As illustrated in FIG. 3, method 300 begins when an applications receives successive access requests (stage 302). The access request may include access information such as a username and password. For example, a network application may receive successive access requests during an access session or from a particular location.

Next, the applications analyze the access request to determine patterns in the access information (stage 304). The analysis may consist of examining the access information to determine cycling in passwords of the access information. Cycling passwords may consist of passwords that are varied in a predictable manner such as "aaaa", "aaab", "aaac", "aaad", etc. The analysis may also consist of examining the access information to determine cycling in the usernames. Cycling user names may consist of utilizing the same password but changing the username with each access request.

Then, the applications generate a security condition based on the analysis (stage 306). If it is determined that the access information contains a pattern, a security condition is generated indicating an access attack. As a result, access during the access session or access from the location may be denied based on the generated security condition.

Figure 4:
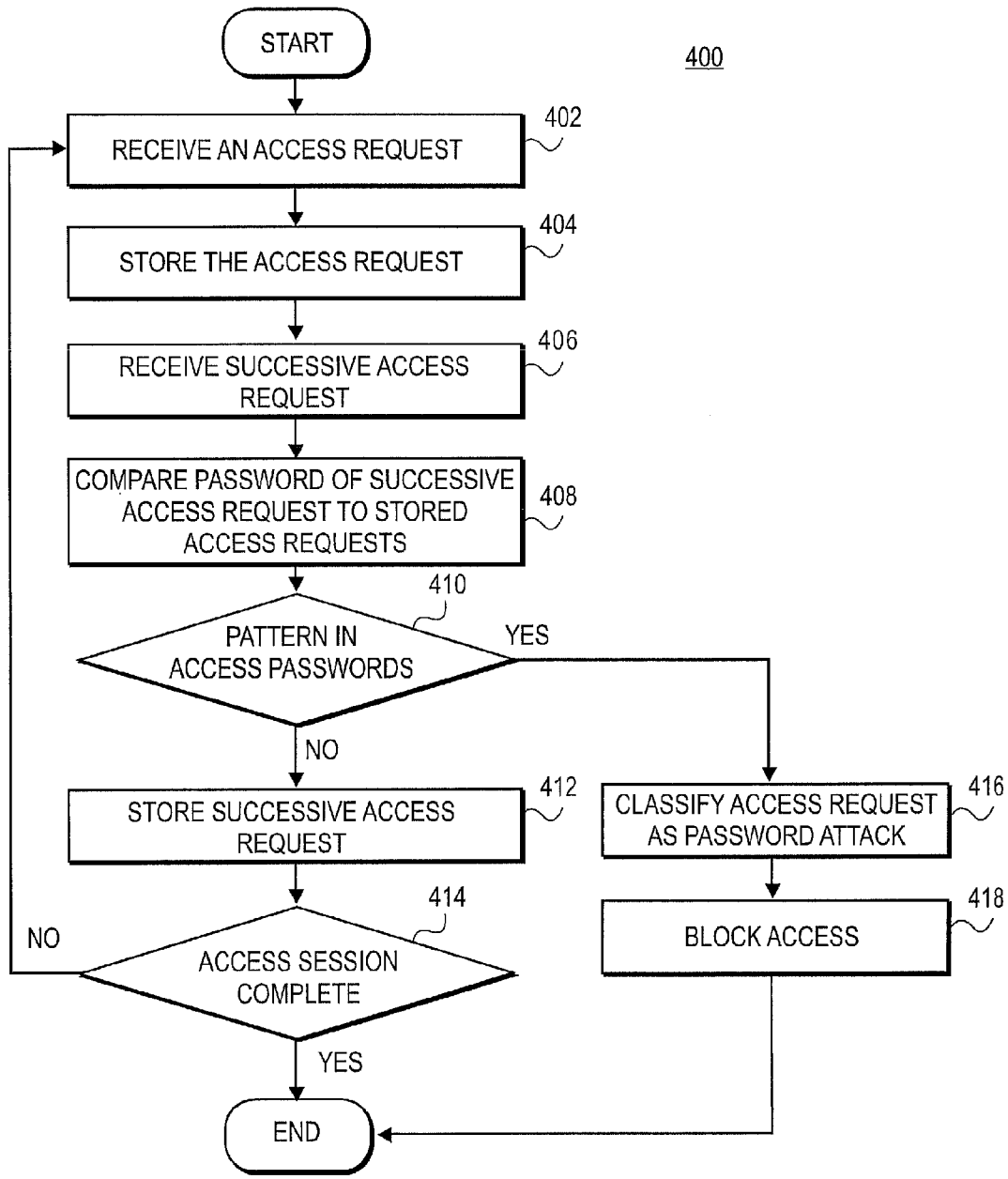
FIG. 4 is a flow diagram illustrating a method for preventing a password attack consistent with embodiments of the present disclosure.

FIG. 4 is a flow diagram illustrating a method 400 for detecting an access attack consistent with embodiments of the present disclosure. Method 400 detects an access attack by analyzing successive access requests to determine patterns in the access information. Particularly, the passwords from successive access requests in an access session are analyzed to determine patterns in the passwords. The analysis may consist of examining the access information to determine cycling in passwords of the access information.

Method 400 may be implemented in any type of application for granting access executed on a computing platform. For example, method 400 may be performed by a web browser or website host application executed on a computing platform. Method 400 may be performed on any computing platform or computing platform in a network system, such as computer platform 200 and network system 100 described below. One skilled in the art will realize that method 400 may be performed on any computing platform in which access to a system requires entry of access information.

As illustrated in FIG. 4, method 400 begins when an application, such as a web browser or website hosting application, receives an access request (stage 402). The access request may include access information such as a username and password.

Next, the application stores the access information from the access request (stage 404). The access information may be stored on any storage medium coupled to the computing platform executing the application. The stored access information may be used by the application in analyzing the password for patterns.

If the access request is correct, the application grants access (not shown). If the access request is incorrect, the application may receive successive access request during the same access session or from the same location (stage 406). The successive access request may be received in the same manner and format as the initial access request.

Then, the application compares the password of the successive access request to the stored passwords of the previous access requests (stage 408). The application compares the passwords to determine if a pattern exists in the successive password and the stored password (stage 410). For example, the application may examine the successive password and the stored passwords to determine cycling in passwords of the access requests in the access session. Cycling passwords may consist of passwords that are varied in a predictable or repetitive manner such as "aaaa", "aaab", "aaac", "aaad", etc.

If the password of the successive access request does not contain a pattern, the application stores the current successive access information with prior access requests (stage 412). The application may then allow the user to continue the access session (stage 414). The application may stop access if a limit on the number of access requests has been reached.

If the passwords of the successive access requests contain a pattern, the application classifies the access session as a password attack (stage 416). In response, the application may block access for the access session (stage 418). For example, the application may block access for the particular username. Additionally, if the access requests are transmitted from a location, the application may block the location transmitting the access requests or block receiving access requests from the location.

Figure 5:
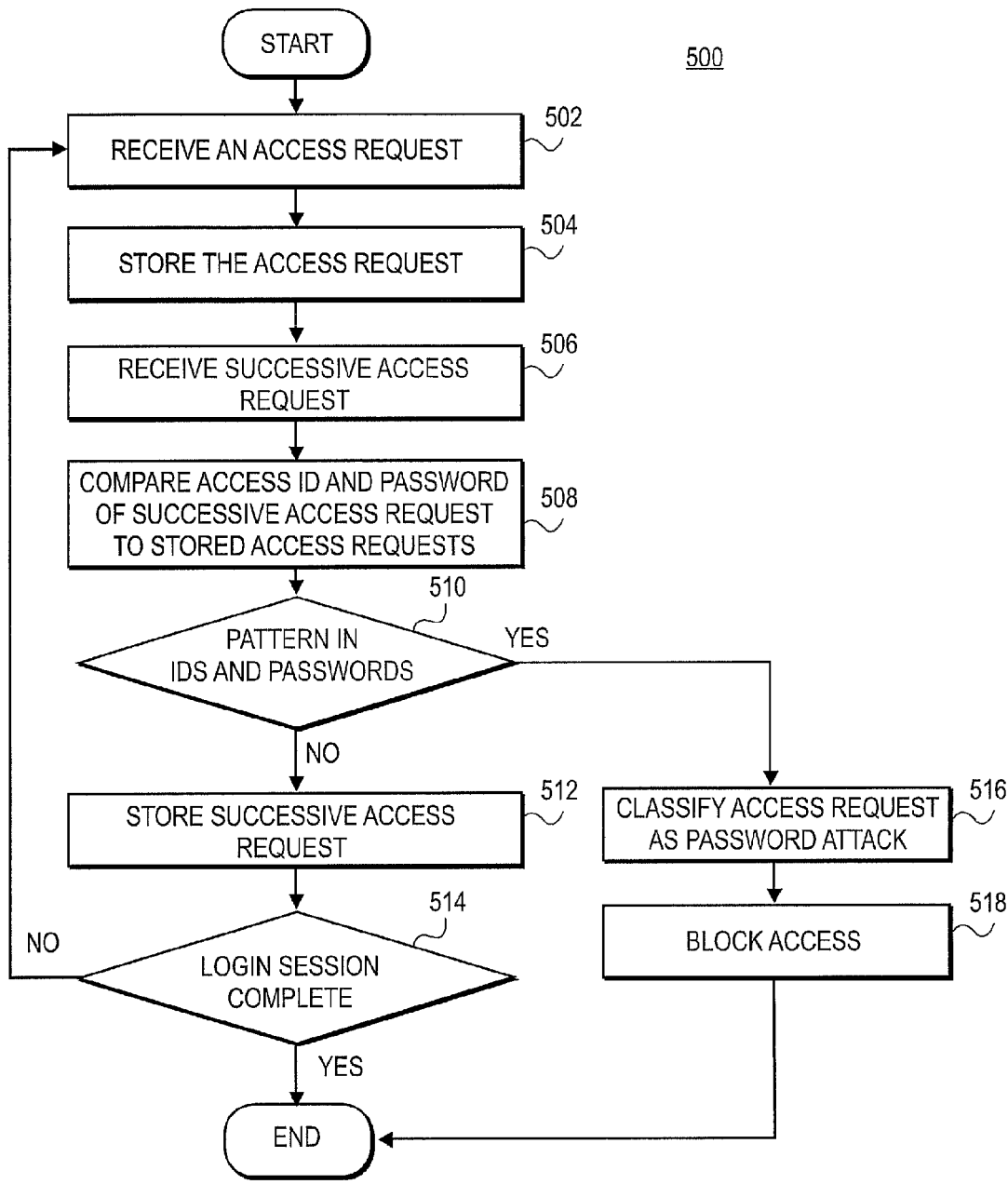
FIG. 5 is a flow diagram illustrating another method for preventing a password attack consistent with embodiments of the present disclosure.

FIG. 5 is a flow diagram illustrating a method 500 for detecting an access attack consistent with embodiments of the present disclosure. Method 500 detects an access attack by analyzing successive access attempts to determine patterns in the access information. Particularly, the usernames from successive access requests in an access session are analyzed to determine patterns in the usernames. The analysis consists of examining the access information to determine identical passwords for various usernames.

Method 500 may be implemented in any type of application for granting access executed on a computing platform. For example, method 500 may be performed by a web browser or website hosting application executed on a computing platform. Method 500 may be performed on any computing platform or computing platform in a network system, such as computer platform 200 and network system 100 described below. One skilled in the art will realize that method 500 may be performed on any computing platform in which access to a system requires entry of access information.

As illustrated in FIG. 5, method 500 begins when an application, such as a browser or website hosting application, receives an access request (stage 502). The access request may include access information such as a username and password.

Next, the application stores the access information from the access request (stage 504). The access information may be stored on any storage medium coupled to the computing platform executing the application. The stored access information may be used by the application in analyzing the usernames for patterns.

If the access request is correct, the application grants access (not shown). If the access request is incorrect, the application may receive successive access requests in the same access session or from the same location (stage 506). The successive access request may be received in the same manner and format as the initial access request.

Then, the application compares the username and password of the successive access request to the stored usernames and passwords of the previous access requests of the same access session (stage 508). The application determines if a pattern exists in the successive username and password and the stored usernames and passwords (stage 510). For example, the analysis may consist of examining the access information to determine if identical passwords have been used for various usernames.

If the username and password of the successive access request does not contain a pattern, the current successive access information is stored with prior access requests (stage 512). The application may then allow the user to continue the access session (stage 514). The application may stop access if a limit on the number of access requests has been reached.

If the usernames and passwords of the successive access requests contain a pattern, the application classifies the access session as a password attack (stage 516). In response, the application may block access for the access session (stage 518). For example, the application may block access for the particular username. Additionally, if the access requests are transmitted from a location, the application may block the location transmitting the access requests or block receiving access requests from the location.

Methods 400 and 500 have been described in relation to an exemplary network application, such as a web browser or web hosting application. One skilled in the art, however, will realize that methods 400 and 500 may be implemented in any application which allows access to a system by requesting the user enter access information.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying a password attack, the method comprising:

receiving a first plurality of successive access requests during a same access session or from a same location, wherein the first plurality of successive access requests comprises a first plurality of passwords for a first username;

receiving a second plurality of successive access requests during the same access session or from the same location, wherein the second plurality of successive access requests comprises a second plurality of passwords for a second username, and wherein each password in the first plurality of passwords and the second plurality of passwords comprises a plurality of alpha-numeric characters;

comparing, by a processor, the plurality of alpha-numeric characters for each of the first plurality of passwords to the plurality of alpha-numeric characters for each of the second plurality of passwords to determine that one or more passwords in the first plurality of passwords are the same as one or more passwords in the second plurality of passwords;

comparing, by the processor, each of the first plurality of passwords to one another to determine that a sequential pattern of changes occurs in the plurality of alpha-numeric characters across the first plurality of passwords; and blocking further access requests from the same location or that use the first username or the second username in response to the determination that the one or more passwords in the first plurality of passwords are the same as the one or more passwords in the second plurality of passwords and that the sequential pattern of changes occurs in the plurality of alpha-numeric characters across the first plurality of passwords.

2. The method of claim 1, wherein blocking the further access requests comprises blocking the further access requests from the same location.

3. The method of claim 1, wherein blocking the further access requests comprises blocking the further access requests that use the first username or the second username.

4. A non-transitory computer readable medium comprising computer-readable instructions for causing a processor to perform operations for identifying a password attack, the operations comprising:

receiving a first plurality of successive access requests during a same access session or from a same location, wherein the first plurality of successive access requests comprises a first plurality of passwords for a first username;

receiving a second plurality of successive access requests during the same access session or from the same location, wherein the second plurality of successive access requests comprises a second plurality of passwords for a second username, and wherein each password in the first plurality of passwords and the second plurality of passwords comprises a plurality of alpha-numeric characters;

comparing, by a processor, the plurality of alpha-numeric characters for each of the first plurality of passwords to the plurality of alpha-numeric characters for each of the second plurality of passwords to determine that one or more passwords in the first plurality of passwords are the same as one or more passwords in the second plurality of passwords;

comparing, by the processor, each of the first plurality of passwords to one another to determine that a sequential pattern of changes occurs in the plurality of alpha-numeric characters across the first plurality of passwords; and blocking further access requests from the same location or that use the first username or the second username in response to the determination that the one or more passwords in the first plurality of passwords are the same as the one or more passwords in the second plurality of passwords and that the sequential pattern of changes occurs in the plurality of alpha-numeric characters across the first plurality of passwords.

5. The non-transitory computer readable medium of claim 4, wherein blocking the further access requests comprises blocking the further access requests from the same location.

6. The non-transitory computer readable medium of claim 4, wherein blocking the further access requests comprises blocking the further access requests that use the first username or the second username.

7. A system for identification of a password attack, the system comprising:

an input to receive a first plurality of successive access requests and a second plurality of successive access requests during a same access session or from a same location, wherein the first plurality of successive access requests comprises a first plurality of passwords for a first username, wherein the second plurality of successive access requests comprises a second plurality of passwords for a second username, and wherein each password in the first plurality of passwords and the second plurality of passwords comprises a plurality of alpha-numeric characters;

a processor, coupled to the input, to compare the plurality of alpha-numeric characters for each of the first plurality of passwords to the plurality of alpha-numeric characters for each of the second plurality of passwords to determine that one or more passwords in the first plurality of passwords are the same as one or more passwords in the second plurality of passwords, compare each of the first plurality of passwords to one another to determine that a sequential pattern of changes occurs in the plurality of alpha-numeric characters across the first plurality of passwords, and to block further access requests from the same location or that use the first username or the second username in response to the determination that the one or more passwords in the first plurality of passwords are the same as the one or more passwords in the second plurality of passwords and that the sequential pattern of changes occurs in the plurality of alpha-numeric characters across the first plurality of passwords.

8. The system of claim 7, further comprising:

a memory coupled to the processor to store the first plurality of successive access requests and the second plurality of successive access requests.

9. The system of claim 7, wherein the processor is further to block the further access requests from the same location.

10. The system of claim 7, wherein the processor is further to block the further access requests that use the first username or the second username.

* * * * *